United States Patent [19]
Laybourn

[11] 3,731,061
[45] May 1, 1973

[54] TWO-WAY DRIVE MECHANISM

[75] Inventor: Robert J. Laybourn, San Jose, Calif.

[73] Assignee: International Business Machines Corporation, Armonk, N.Y.

[22] Filed: Dec. 28, 1970

[21] Appl. No.: 101,682

[52] U.S. Cl. ......235/61.11 D, 179/100.2 T, 198/110
[51] Int. Cl. ..............................G11b 5/52, G06r 7/08
[58] Field of Search ..............179/100.2 T, 100.2 MP; 235/61.11 D; 74/222, 82, 10.7, 89.2, 89.22; 198/110, 111

[56] References Cited

UNITED STATES PATENTS

| | | | |
|---|---|---|---|
| 2,878,684 | 3/1959 | Kerfoot | 198/110 |
| 3,523,164 | 8/1970 | Krueger, Jr. et al. | 179/100.2 T |
| 3,588,378 | 6/1971 | Protas | 179/100.2 T |

*Primary Examiner*—Thomas A. Robinson
*Attorney*—Hanifin and Jancin and Shelley M. Beckstrand

[57] ABSTRACT

A drive mechanism for causing, for example, a magnetic read head to scan a magnetic track on an identification card. The head is mounted to a carriage which is driven in a forward or reverse direction along a guide rod by bringing one of two feeler gauge drive ribbons fixedly attached to said carriage into engagement with a constantly rotating drive wheel. The head may be mounted to a rigid head mount and rotated out of contact with the card on the return stroke, with the card spring-biased against the head on the forward stroke. Alternatively, the head may be spring-loaded to the carriage with flexible feeler gauge drive ribbons alternatively brought into contact with the drive roller.

1 Claim, 5 Drawing Figures

INVENTOR
ROBERT J. LAYBOURN
BY Shelley M. Beckstrand
ATTORNEY

TWO-WAY DRIVE MECHANISM

FIELD OF THE INVENTION

The invention is related to a two-way drive mechanism for causing a magnetic head to scan a magnetic track data card.

BACKGROUND OF THE INVENTION

Prior Art

Many different arrangements have been suggested for causing relative motion between a magnetic data card or identification card and a read head. One common practice is to drive the card past the stationary head. Generally, such arrangements require the use of a plurality of drive and idle rotors, moving trays, and/or reversing clutches or spring-return mechanisms. Those applications of this technique suggested for handling identification cards have required, for safety reasons if no other, that the unit capture the card and drive it along a path contained within protective covers, such that the card is invisible to the customer. A mechanical failure of the device would then result in the card's being lost to the customer or requiring that an operator or repairman remove the covers at the expense of delay and frustration to the customer.

Various techniques have been suggested for driving a read head past a magnetic stripe or along a magnetic encoded track, including a hand cocked, spring and governor controlled device. The major problem with such devices is jitter; that is, the reproduction of an unstable signal with respect to signal amplitude and frequency caused by variable velocity of the head.

A further mechanism suggested for driving a read head past a magnetic data bearing card is to mount the head on a carriage which is driven by motor along a lead screw. Such mechanisms require complicated head return devices, such as a reversing mechanism for the lead screw, means for disengaging the thread of the lead screw, or an expensive two-way thread. The latter would require that the lead screw be stopped at home position if the head is to remain in the ready state for another cycle.

Another possible mechanism for driving a head past a data bearing card includes a rack and pinion device. However, such a device requires complicated means for stopping and reversing the rack or the pinion. Also, jitter would be an increasing problem as the gear teeth wear.

SUMMARY OF THE INVENTION

It is, therefore, an object of the invention to provide an improved mechanism for driving a read head across a magnetic data or identification card.

It is a further object of the invention to provide a read head drive mechanism which has few parts, and essentially eliminates jitter by driving the read head at a constant speed.

It is a further object of the invention to provide a read head drive mechanism that also stops the head at the end of a read scan without external controls.

It is a further object of the invention to provide a read head drive mechanism that will return to home position without reversing the direction of the drive motor.

It is a further object of the invention to provide a read head drive mechanism that will have minimal wear characteristics, and which does not result in increasing jitter as wear occurs.

The invention provides a read head drive mechanism comprising a head mounted to a carriage on a guide rod, a constantly rotating drive roller, feeler gauge drive means, and means for engaging said feeler gauge drive into contact with said drive roller, thereby driving the carriage along the guide rod for the length of the feeler gauge. The engaging means may also rotate the carriage about the guide rod to move the head into or out of contact with a spring loaded identification card.

The foregoing and other objects, features and advantages of the invention will be apparent from the following more particular description of the preferred embodiments of the invention as illustrated in the accompanying drawings.

DESCRIPTION

Figure 1:
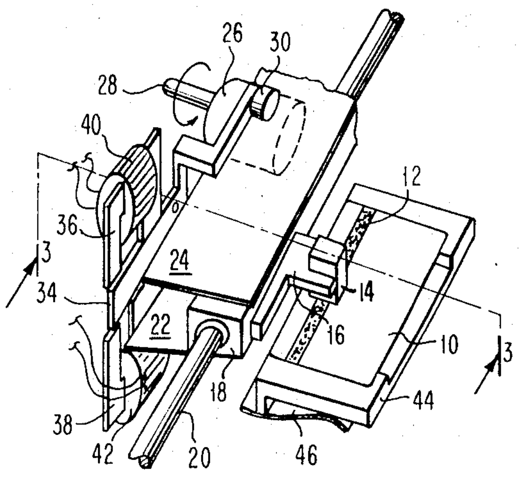
FIG. 1 is a pictorial and diagrammatic view of one preferred embodiment of the invention showing the dual feeler gauge drive means and the pivot and guide rod means together with the spring-loaded card bed, thereby providing a fixed stable head mount.

Referring now to FIG. 1, a description will be given of one preferred embodiment of the invention for driving read head 14 along magnetic track 12 on identification or credit card 10. Credit card 10 may be a standard Mister size credit card, for example, of the type issued by petroleum companies, banks, and so forth. Attached to credit card 10 is, for example, magnetic stripe 12, which may be applied to the base 10 by hot stamp or wet stripe processes known in the art. Also, stripe 12 may comprise a plurality of discrete magnetic bits of discontinuous magnetic material placed on the card, such as magnetic bar code array or, optical scanning marks, etc.

Card 10 is placed in card holder 44 which is mounted to a base not shown and spring-biased by spring 46 upwards against the bottom of head 14.

Head 14 is mounted by mount 16 to carriage 18. Carriage 18 is mounted by a bearing on pivot and guide rod 20, such that it may move or be driven axially along said rod and pivot about the axis of said rod as will be more fully described later.

The means provided for driving the carriage along the pivot and guide rod 20 and for pivoting said carriage about said rod will next be described.

Feeler gauge drive ribbons 22 and 24 are fixedly attached to carriage 18. Disposed between said feeler gauge drive means 22 and 24 and mounted on shaft 28 is drive roller 26 which is constantly rotated by a motor which is not shown.

Idle roller 30 is mounted to drive armature 34, which is pivoted in such a manner that as magnet 40 is actuated, establishing a magnetic path through armatures 36 and 34, said idle roller 30 is driven into contact with feeler gauge drive 24, forcing said feeler gauge into contact with drive roller 26 and pivoting carriage 18 about rod 20 so as to lift head 14 out of contact with card 10 for a return stroke.

Similarly, actuation of magnet 42 establishes a flux through armatures 34 and 38 which causes said armature 34 to pivot to bring an idle roller (not shown) into contact with feeler gauge 22, forcing said feeler gauge 22 into contact with drive roller 26 for driving carriage 18 along guide rod 20 in a read direction and pivoting said carriage 18 about said rod 20 to force the head 14 into contact with card 10 to scan the magnetic data in track 12.

Thus, in operation, the operator or customer places card 10 in card bed 44 and actuates magnet 42. This causes an idle roller beneath feeler gauge 22 to drive said feeler gauge into contact with drive roller 26. Consequently, rotating drive roller 26 rides upon feeler gauge 22 rotating the carriage 18 about pivot and guide rod 20 to bring head 14 into contact with track 12 on card 10 and driving the carriage 18 axially along guide rod 20 to cause a scanning motion of head 14 along track 12. As will be more fully described hereafter, as the end of feeler gauge drive 22 is reached, carriage 18 stops without further action. Thereafter, magnet 40 may be actuated to lift head 14 off of the card 10 and drive the carriage 18 back to home position, where it will rest until magnet 42 is once again actuated.

Figure 2:
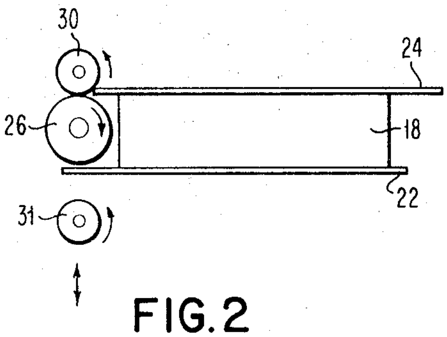
FIG. 2 is a diagrammatic view showing the relationships between the two feeler gauges in the dual feeler gauge drive embodiment and the associated drive and idle rollers.

Referring now to FIG. 2, the relationship between the drive roller 26, idle rollers 30 and 31, and feeler gauge drive ribbons 22 and 24 will be described. In this view, the relationship is the same as would be viewed from the head 14 side of carriage 18 in FIG. 1. or FIG. 3

Also, as shown in FIG. 2, the control ribbons 22 and 24 are shown resting at the end of a read scan motion, with magnet 40 still actuated to bring idle roller 30 into engagement with drive roller 26. As viewed, the feeler gauge ribbon 24 has just passed beyond the point where it will be driven by drive roller 26. In this position, the portion of feeler gauge drive ribbon 22 remains between idle roller 31 and drive roller 26 and in a position where it may be engaged for a return stroke.

Upon actuation of magnet 42, with magnet 40 released drive roller 31, which is attached to armature 34 and positioned beneath feeler gauge drive ribbon 22 as discussed above, will be driven upwards to engage feeler gauge drive ribbon 22. Thereupon, drive roller 26 will drive ribbon 22 until the rightmost extremity of said ribbon is reached and passes beyond the point where wheels 26 and 31 cooperate to impart a driving force to said ribbon 22. At the end of this motion, the carriage 18 has completed a read scan and is awaiting actuation of idle roller 30 to force ribbon 24 into contact with drive roller 26 to return carriage 18 to its home position.

Figure 3:
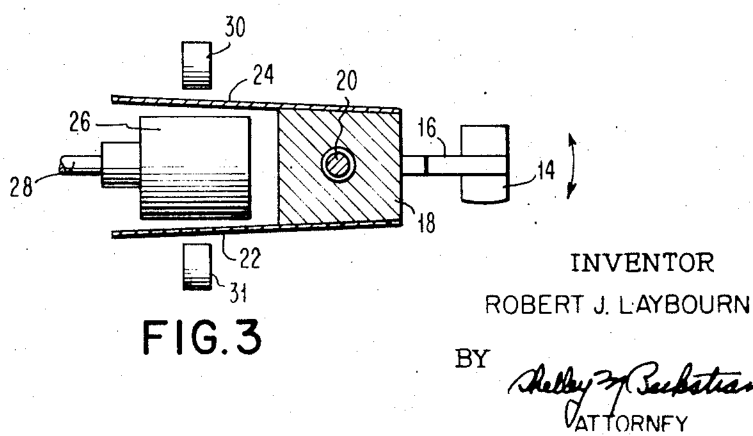
FIG. 3 is a cross section view of FIG. 1 showing the movement for disengaging the head from the card on the return stoke characterized by the stiff feeler gauge drive means and rigid head mount.
Figure 4:
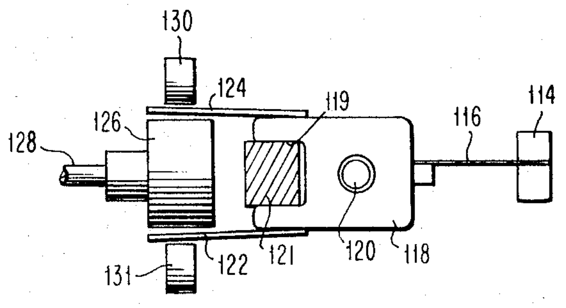
FIG. 4 is a similar view to FIG. 3 and used in connection therewith to show the spring-loaded head and flexible feeler gauge drive means in an embodiment where the carriage does not rotate about the guide rod for disengaging the head on the return stroke.

Referring now to FIG. 4 in connection with FIG. 3, a description will be given of a second preferred embodiment of the invention for driving the read head 14, 114, to scan magnetic track on a data card. FIG. 3 is a cross section of FIG. 1, and shows the relationship between the feeler gauges 24, 22, pivot and guide rod 20, head mount 16 and head 14 in a similar manner to that selected for showing the second embodiment to be described. Referring now to FIG. 4, head 114 is mounted by a flexible member 116 to carriage 118. Carriage 118 is mounted to guide rod 120 by a varying arrangement to that shown in FIGS. 1 and 3. However, in the embodiment of FIG. 4, carriage 118 also includes a longitudinal groove 119 which rides along the guide surfaces of guide 121 for preventing rotation of carriage 118 about the axis of rod 120. Mounted on motor shaft 128 is constantly rotating drive roller 126. Idle rollers 130 and 131 are actuated in a manner which may be similar to that shown for actuating 30 and 31 in FIGS. 1, 2, and 3. In the embodiment of FIG. 4, the feeler gauge drive ribbons 122 and 124 are flexible. Thus, as idle roller 130 is actuated, flexible feeler gauge drive 124 is forced downward into contact with driver roller 126. During this motion, carriage 118 is held rigid against rotation by guide 121. Similarly, as idle roller 131 is actuated, flexible feeler gauge 122 is forced upward into contact with drive roller 126. During this motion, carriage 118 is held against rotation about shaft 120 by guide 121 cooperating with the guide surfaces 119 within the carriage 118.

In this embodiment, head 114 is spring-loaded against the card 10 and is not brought out of contact with the card on the return stroke following a read scan movement.

Figure 5:
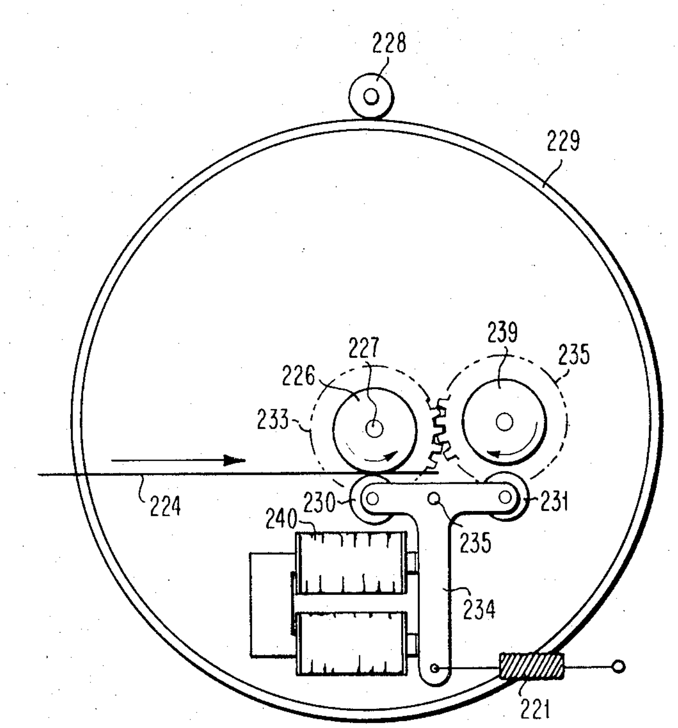
FIG. 5 is a diagrammatic view of a third embodiment of the invention utilizing a single feeler gauge drive means and the associated drive and idle rollers for driving the control ribbon a precise distance and automatically returning it to home with the use of only one actuator.

Referring now to FIG. 5, a description will be given of a third preferred embodiment of the invention for driving a read head past a data bearing magnetic card. In FIG. 5, feeler gauge drive ribbon 224 is shown. Attached to said feeler gauge drive ribbon are a carriage and the associated read heads, which are not shown.

Motor shaft 228 rides on the outside of a large wheel 229. Wheel 229 is mounted to shaft 227. Wheel 226 is also mounted to shaft 227 and turns with wheel 229. With motor shaft 228 being constantly driven in a clockwise direction, wheels 229 and 226 are driven in a counter clockwise direction. Also mounted on shaft 227 is a gear or polyurethane wheel 233 which engages a similar wheel 235 which is mounted on a common shaft with roller 239. Thus, rollers 226 and 239 are constantly rotating in opposite directions. Mounted on armature 234 are idle rollers 230 and 231. Said armature is pivoted at 235, in such a manner that spring 221 exerts a force on armature 234 tending to bring idle roller 231 into contact with roller 239. On the other hand, actuation of magnet 240 overrides the spring force 221 and rotates armature 234 about pivot point 235 to bring idle roller 230 up into contact with roller 226.

In operation, when a read scan is to be performed, magnet 240 is actuated, forcing idle roller 230 into contact with control ribbon 224 forcing said ribbon against drive roller 226 for driving said ribbon from the position shown to the right until the leftmost part of said ribbon 224 passes between rollers 230 and 226 whereupon the ribbon automatically stops with no further action inasmuch as no further force is exerted against it by rollers 226, 230. In this position, there is a clearance between rollers 231 and 239 which permits the ribbon to pass therebetween and stop. To return the ribbon 224 to the position shown, magnet 240 is de-energized, and spring 221 forces idle roller 231 into contact with ribbon 224. This moves ribbon 224 into driving engagement with roller 239 which drives said ribbon to the left until the rightmost part of the ribbon passes between the rollers 239 and 231, whereupon it stops in the home position.

Thus, a head mounted to the carriage which is attached to said ribbon 224 is caused to scan, for example, a magnetic track on a plastic or PVC identification or credit card.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A data card scanning apparatus comprising:

a spring loaded card bed, a transducer fixedly attached to a carriage, said carriage being mounted on a guide and pivot rod and being free to rotate about and translate parallel to the longitudinal axis of said rod, a constantly rotating drive roller, first and second control ribbon means attached to said carriage for rotating and translating said carriage, idle roller means selectively actuatable for causing said first or second control ribbon means to engage said drive roller, whereby said transducer scans the data track of a card positioned in said bed in a forward direction, and is rotated out of the scanning mode during the return to home movement.

* * * * *